Patented July 1, 1924.

1,499,795

UNITED STATES PATENT OFFICE.

JAMES B. WHERRY, OF ARDMORE, SOUTH DAKOTA.

PROCESS FOR PREPARING EXCHANGE SILICATES FOR INDUSTRIAL PURPOSES.

No Drawing.　　　Application filed June 12, 1922.　Serial No. 567,825.

*To all whom it may concern:*

Be it known that I, JAMES B. WHERRY, a citizen of the United States, residing at Ardmore, in the county of Fall River and State of South Dakota, have invented new and useful Improvements in Processes for Preparing Exchange Silicates for Industrial Purposes, of which the following is a specification.

My invention relates to the treatment, for commercial or industrial use, of that class of exchange silicates found in nature, which possess water softening properties.

The natural state of the raw material to be treated is usually that of clayey substance consisting of a hydrated silicate of aluminum which contains alkalis and alkaline earths, together with a small percentage of iron compounds including iron silicates. Such raw material (found in parts of the United States) possesses exchange properties to a greater or less degree and may after treatment be used for removing the calcium and magnesium salts, usually termed the hardening salts, from water, or for any other purpose for which base exchange silicates may be adapted. While it is true that the natural silicates referred to have the property of base exchange, nevertheless it is not practical to use them commercially in their natural state because in that state these clayey substances resolve themselves into compact masses through which liquids cannot readily or rapidly filter. Moreover, in the natural state the raw material referred to contains a large percentage of microscopic particles which are fine enough to render the material colloidal in character. Furthermore, the natural material has mechanically mixed therewith foreign matter, which is soluble and therefore objectionable, and the proportion of alkalis and alkaline earths varies.

With the above factors in view it is a primary object of my invention to provide a novel and efficient process for treating naturally occurring clays in such a manner that they will have a uniform chemical composition and be free from objectionable foreign matter which originally was mixed therewith.

A further object is to adapt the plastic colloidal raw material to form hard granules of convenient size, which will not disintegrate when placed in water, but will retain the base exchange properties of the original substance.

It is also my object to correct the proportions of alkalis and alkaline earths present in the natural exchange silicates by adding predetermined and proper amounts of alkalis or alkaline earths and a salt of sodium or potassium to a slurry of the natural silicates before drying or reducing the mass to granules of suitable size.

In my improved process I first make a slurry of the naturally occurring clay and remove the mechanically mixed foreign matter and then by the addition of suitable reagents (hereinafter described) bring the clay approximately to the following composition:

| | |
|---|---:|
| Combined water (above 110 deg. C.) | 7.10 |
| Silicon dioxide | 57.23 |
| Iron oxide | 3.50 |
| Aluminum oxide | 24.70 |
| Manganese dioxide | — |
| Calcium oxide | 2.50 |
| Magnesium oxide | 2.16 |
| Sodium oxide | 1.71 |
| Potassium oxide | — |
| Sulphur trioxide | .10 |
| Hydrogen sulphide | — |
| Carbon dioxide | — |
| Chlorides | .38 |
| | 99.38 |

The substances in the natural or raw clay which vary largely and must be corrected are the calcium and magnesium. To correct these substances in a given batch, the raw clay is analyzed and if the content of these important substances varies materially from the proportions given above an appropriate amount of the deficient substance is added.

In a given batch, for example, it might be found that there is insufficient calcium. In this case a 6% solution of a soluble calcium salt such as calcium chloride might be added to the slurry. On the other hand, if the magnesium content should be low, magnesium chloride or sulphate would be added. One or more salts of alkali metals, or the alkaline earth metals mentioned above are thus added (from 2 to 10% by weight as determined by analysis of the natural clay) to correct by chemical exchange the proportions of the bases present. In this step the addition of salt or salts of alkali or alkali earth metals to the slurry definitely produces a uniform strength of bases throughout the product and will be, for convenience, hereinafter referred to as alkalizing the clay.

The foreign matter mechanically mixed with the clay is removed by passing the slurry over a classifier of a suitable type.

After the introduction of the desired percentage of a salt or salts of alkali or alkaline earth metals I consider it desirable, although not essential to my invention, to pass the material thus rectified through a thickener of any suitable kind, which serves to eliminate a considerable part of the water in the slurry and also to wash away impurities in the solution. Whatever excess water may then remain over that desired for the production of a plastic, easily working mass is removed by suitable filters and at this point a water wash is used to further remove soluble impurities and the excess of the salts used for rectifying.

The plastic mass resulting from the treatment above described is now forced through dies of suitable size and pressed into long string-like forms, loosely termed "noodles," which are conveyed or carried into low temperature dryers. Here the greater part of the free moisture is removed and the resultant particles rendered of sufficient hardness so that they may be ground and classified as desired, into granules. This drying step, though desirable in most cases, may be omitted, all of the moisture being expelled as follows: The dried particles resulting from the treatment in the low temperature dryers or if desired the plastic "noodles" from the dies are next subjected to a heat treatment which may be referred to as a baking step, the temperature at this stage of the process being sufficiently high to completely dehydrate the material without fusing it. That is to say, this last mentioned step is intended to remove all of the water of constitution as well as the chemically combined water so that the particles are completely dehydrated but the heat applied is not sufficient to cause fusion of the particles. An important and distinctive feature of this baking step is that it completely dehydrates the colloidal matter to which the plasticity of the raw material is due and renders the granules rigid and non-cohesive. Thus the matter which was colloidal forms a net work of reinforcement throughout the particles which is not destroyed by the subsequent treatment.

To indicate to the operator when the proper temperature has been reached during the heat treatment it is preferable, though not essential that a small amount (about 2%) of sodium chloride be added to the slurry before the drying is commenced. This sodium chloride causes the material to turn slightly reddish in color when the proper temperature (about 800 deg. centigrade) has been reached in the furnace.

The completely dehydrated material is next subjected to the action of an aqueous solution of a hydroxide of one or more alkali metals, such as sodium or potassium hydroxide in excess for a period of several hours, or until the reaction is completed. The purpose of this rehydrating step is to remove any excess silica and restore the chemically combined water lost by the heat treatment, thus reviving the chemical properties of the material so that it will function as a base exchange material and will give up its sodium content for the calcium or magnesium content in hard water, or vice versa.

As a final step the hydrated material is washed free from excess alkali hydroxides and insoluble impurities, thus placing it in condition for use for water softening or other industrial purposes.

Having described my invention what I claim as new and desire to protect by Letters Patent is:

1. The method of producing granulated zeolite from natural clay which comprises first producing a slurry from the clay then alkalizing the slurry to correct the quantity of bases present, then reducing the mass to dry particles by heating to a temperature sufficiently high to completely dehydrate the same and subsequently rehydrating the dried particles.

2. The method of producing granulated zeolite from natural clay which comprises first producing a slurry from the clay then alkalizing the slurry, then reducing the mass to dry particles by heating to a temperature sufficiently high to completely dehydrate the same and subsequently rehydrating with an alkali-metal hydroxide.

3. The method of producing granulated zeolite from natural clay which comprises first producing a slurry from the clay then alkalizing the slurry to correct the quantities of bases present and adding a 2% solution of sodium chloride then reducing the mass to dry particles, by heating to a temperature sufficiently high to completely dehydrate the same and subsequently rehydrating the dried particles to render them capable of softening water.

4. The method of making base exchange silicates from natural clay which includes the step of first producing a slurry, adding to the slurry an alkali earth-metal salt, and removing mechanically mixed foreign matter, subsequently removing from the slurry the greater part of the water content thereof leaving a plastic mass, then forming the plastic mass into particles, then heating the particles to a temperature sufficiently high to completely dehydrate the same and finally rehydrating the material to render it capable of softening water.

5. The method of making base exchange silicates from natural clay which comprises first producing a slurry, alkalizing the slurry to correct the quantities of bases present, removing from the slurry the water content thereof leaving a plastic mass, then reducing the plastic mass into string-like particles and drying and forming granules thereof, then subjecting the dried particles to a temperature sufficiently high to completely dehydrate the same and finally rehydrating the material to render it capable of softening water.

6. The method of producing granulated zeolite from natural clay which consists in, alkalizing the clay to correct the quantities of bases present, then reducing the mass to particles and heating to a temperature sufficiently high to completely de-hydrate the same and subsequently re-hydrating the particles to render them capable of softening water.

In testimony whereof, I have hereunto signed my name to this specification.

JAMES B. WHERRY.